United States Patent
Nagai et al.

(10) Patent No.: US 6,837,324 B2
(45) Date of Patent: Jan. 4, 2005

(54) ENGINE ENCLOSURE

(75) Inventors: Hiroki Nagai, Izumiotsu (JP); Takashi Shibata, Sakai (JP); Hiroyuki Ogasawara, Kawachinagano (JP); Kazuaki Kurohara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/081,873

(22) Filed: Feb. 22, 2002

(65) Prior Publication Data

US 2003/0057005 A1 Mar. 27, 2003

(30) Foreign Application Priority Data

Sep. 21, 2001 (JP) ........................................ 2001-289597

(51) Int. Cl.[7] .............................................. B60K 13/02
(52) U.S. Cl. .................................. 180/68.3; 123/198 E
(58) Field of Search .............................. 180/68.1, 68.2, 180/68.3, 69.2, 69.21; 123/41.7, 195 C, 198 E; D15/15

(56) References Cited

U.S. PATENT DOCUMENTS

| | | | | |
|---|---|---|---|---|
| 864,702 A | * | 8/1907 | Sherwin | .................... 180/68.1 |
| 3,884,322 A | | 5/1975 | Nemschoff | |
| 4,969,533 A | | 11/1990 | Holm et al. | |
| D325,208 S | * | 4/1992 | Hosonuma | ................... D15/15 |
| 5,193,636 A | | 3/1993 | Holm | |
| 5,207,187 A | * | 5/1993 | Kurobora et al. | ........... 123/41.7 |
| 5,678,648 A | * | 10/1997 | Imanishi et al. | ............ 180/68.1 |
| 5,689,953 A | * | 11/1997 | Yamashita et al. | ...... 123/41.7 X |
| 5,718,303 A | * | 2/1998 | Ogasawara et al. | ....... 180/69.21 |
| 5,782,312 A | | 7/1998 | Murakawa | |
| D421,266 S | * | 2/2000 | Hinklin | ........................ D15/15 |
| D423,520 S | * | 4/2000 | Smith | .......................... D15/15 |
| 6,439,328 B1 | * | 8/2002 | Vaillancourt et al. | ....... 180/68.1 |
| D473,570 S | * | 4/2003 | Kuwae | ......................... D15/15 |

FOREIGN PATENT DOCUMENTS

| JP | 4-66328 | * | 3/1992 |
|---|---|---|---|
| JP | 4-243629 | * | 8/1992 |

* cited by examiner

*Primary Examiner*—Bryan Fischmann
(74) *Attorney, Agent, or Firm*—Webb Ziesenheim Logsdon Orkin & Hanson, P.C.

(57) ABSTRACT

An engine enclosure for use on a vehicle having a cooling system for a vertical shaft type engine with a cooling air intake fan disposed above the engine. The engine enclosure comprises an upper hood for covering the engine from above, the upper hood having an upper surface and right and left side surfaces extending downward from the upper surface, a lower hood for covering lateral areas of the engine, and a cooling air intake opening formed in a position above a lower end of at least one of the right and left side surfaces of the upper hood for taking in ambient air. A partition wall member is disposed between the cooling air intake opening and the cooling air intake fan for restricting mixing of ambient air drawn by the fan and heat generating from the engine.

13 Claims, 16 Drawing Sheets

ENGINE ENCLOSURE

BACKGROUND OF THE INVENTION

1. Field of the Invention

This invention relates to an improvement in a structure of engine enclosure, or a hood and a cooling air intake system disposed adjacent the hood, mounted on a vehicle, particularly a lawn mower.

2. Description of the Related Art

The main function of a hood on a vehicle such as a lawn mower is to protect the engine. For the very reason of this function, the hood must be designed by taking into account easiness of access for maintenance of the engine and supply of air to the engine.

As disclosed in U.S. Pat. No. 4,969,533, for example, a conventional hood on a lawn mower is the type that surrounds even lower areas of an engine. The hood disclosed in the above patent includes a grille-like air intake extending from each side surface to an upper surface.

A different type of hood is not integral but divided into an upper portion and a lower portion. The divided type of hood shown in the U.S. Pat. No. 5,193,636, in particular, has a structure for drawing in air through a space between an upper hood portion and a lower hood portion for supply to an engine.

Where the engine is enclosed in a hood having an integral structure as noted above, the entire hood must be moved or detached to allow access to only an upper portion of the engine. Thus, access to the engine is difficult.

In the vertically divided type of hood, air is drawn through a downwardly opening space between an upper hood portion and a lower hood portion for supply to an engine. This structure has a drawback that it is highly likely to draw in through the downward opening dust and grass clippings tending to be produced adjacent the ground during a grass cutting operation.

SUMMARY OF THE INVENTION

The object of this invention is to provide a vehicle engine cooling system, particularly an engine enclosure, that overcomes the disadvantages of the prior art noted above to enable easy access to upper portions of an engine and to draw in ambient air through a relatively high position for supply to an engine fan.

The above object is fulfilled, according to this invention, by an engine enclosure for a vertical shaft type engine with a cooling air intake fan disposed above the engine, the engine enclosure comprising an upper hood for covering the engine from above, the upper hood having an upper surface and right and left side surfaces extending downward from the upper surface; a lower hood for covering lateral areas of the engine; and a cooling air intake opening formed in a position above a lower end of at least one of the right and left side surfaces of the upper hood for taking in ambient air.

In this construction, the hood is divided into the upper hood and the lower hood. For accessing the engine, only the upper hood may have to be moved, allowing for easy access to the engine. Thus, a maintenance operation may be carried out in a reduced time. Further, since the cooling air intake opening is formed laterally of the upper hood, there is a reduced chance of sucking dust and grass clippings present close to the ground, hence adversely affecting the engine.

The engine enclosure may further comprise a fan cover for covering an upper portion of the engine including the fan and having an air passage for permitting inflow of cooling air to the fan, the lower end of the upper hood being located above a lower end of the fan cover. Since the engine is covered with the fan cover, the upper hood may be opened for accessing the engine with a less chance of exposure to the heat.

In a preferred embodiment of this invention, the engine enclosure further comprises a partition wall member disposed between the cooling air intake opening and the cooling air intake fan for restricting mixing of ambient air drawn by the fan and heat generating from the engine. This construction restricts mixing of ambient air and heat from the engine, thereby maintaining the air taken into the engine through the cooling air intake fan at a low temperature, to produce an excellent cooling effect. It will be convenient if the partition wall member defines a duct for guiding the ambient air to the fan.

In another preferred embodiment of this invention, the partition wall member is attached to the upper hood, the upper hood being displaceable between a closed position adjacent the lower hood and an open position, the fan being exposed when the upper hood is in the open position. With this construction, when the upper hood is moved to the open position, the partition wall member moves therewith to expose the upper portion of the engine. Thus, maintenance may be performed for the upper portion of the engine only by moving the upper hood, thereby further saving time and labor needed for the maintenance.

In a further preferred embodiment of this invention, the cooling air intake openings are formed in both of the right and left surfaces of the upper hood, at least one barrier wall being disposed between the cooling air intake openings so that one of the cooling air intake openings is invisible to the other cooling air intake opening. With the barrier wall installed, the cooling air intake opening at the other side cannot be seen. Thus, the presence of the cooling air intake openings does not affect the outward appearance of the lawn mower, thereby maintaining a high-quality design feature.

In a further preferred embodiment of this invention, the engine enclosure further comprises a barrier wall disposed between the cooling air intake opening and the fan for restraining the ambient air taken in through the cooling air intake opening from directly reaching the fan. With this barrier wall installed, even when dust and grass clippings enter from the cooling air intake opening, air will make a rapid detour around the barrier wall. Consequently, dust and grass clippings are prevented from being sucked directly by the fan, to reduce the possibility of affecting the engine.

The cooling air intake opening has a lower end thereof located above an upper end of the fan cover covering the fan. Then, air will flow smoothly downward from the intake opening.

In a further preferred embodiment of this invention, the cooling air intake opening has a forward end thereof located forwardly from a suction port of the fan, and a rear end located in a position corresponding to or rearwardly of the air passage of the fan cover, the cooling air intake opening being open continuously from the forward end to the rear end.

In this construction, the cooling air intake opening is located in a position corresponding to the fan, so that air taken in flows through a short distance to reach the fan. In addition, the cooling air intake opening is open continuously from the forward end to the rear end to provide a large area for admitting air. Thus, the incoming air flows at reduced speed. This lowers the possibility of sucking dust and grass clippings.

Further, the partition wall member may be fixed to the side surfaces of the upper hood. Then, in time of manufacturing the upper hood, its width need not be adjusted strictly to the width of the lower hood. By determining a width of the partition wall member accurately, a width relationship in contact positions between the upper hood and lower hood may be determined accurately. A spacing between the upper hood and lower hood may also be determined accurately.

This invention proposes an engine cooling system for use on a lawn mower having a vertical shaft type engine with a cooling air intake fan disposed above the engine. This system comprises a fan cover for covering the fan; a hood for covering the engine, the hood including an upper hood having a lower end located above a lower end of the fan cover, and a lower hood, wherein the upper hood is displaceable between a closed position adjacent the lower hood and an open position; a cooling air intake opening formed in at least one of the upper hood adjacent a control panel and the control panel for taking in ambient air; and a partition wall member disposed between the cooling air intake opening and the cooling air intake fan for restricting mixing of ambient air drawn by the fan and heat generating from the engine, the partition wall member being fixed to the upper hood, a portion of the partition wall member extending to a position adjacent the cooling air intake opening to take in ambient air drawn in through a position above the lower end of the upper hood.

In this construction also, the hood is divided into the upper hood and the lower hood. For accessing the engine, only the upper hood may have to be moved, allowing for easy access to the engine. Thus, a maintenance operation may be carried out in a reduced time. Moreover, a portion of the partition wall member extends to a position adjacent the cooling air intake opening to take in ambient air drawn in through a position above the lower end of the upper hood. Thus, there is a reduced chance of sucking dust and grass clippings present close to the ground, hence adversely affecting the engine.

In a further preferred embodiment, the cooling air intake opening is formed in the control panel, the portion of the partition wall member being part of a lower surface thereof and extending rearwardly of the lawn mower to take in ambient air from the cooling air intake opening.

With part of the lower surface of the partition wall member extending rearwardly and upward as above, this simple construction enables sucking of ambient air from the cooling air intake opening formed in an upper portion of the control panel. This partition wall member may be manufactured by a simple process.

Other features and advantages of this invention will be apparent from the following description of the embodiments to be taken with reference to the drawings.

DESCRIPTION OF THE PREFERRED EMBODIMENTS

Figure 1:
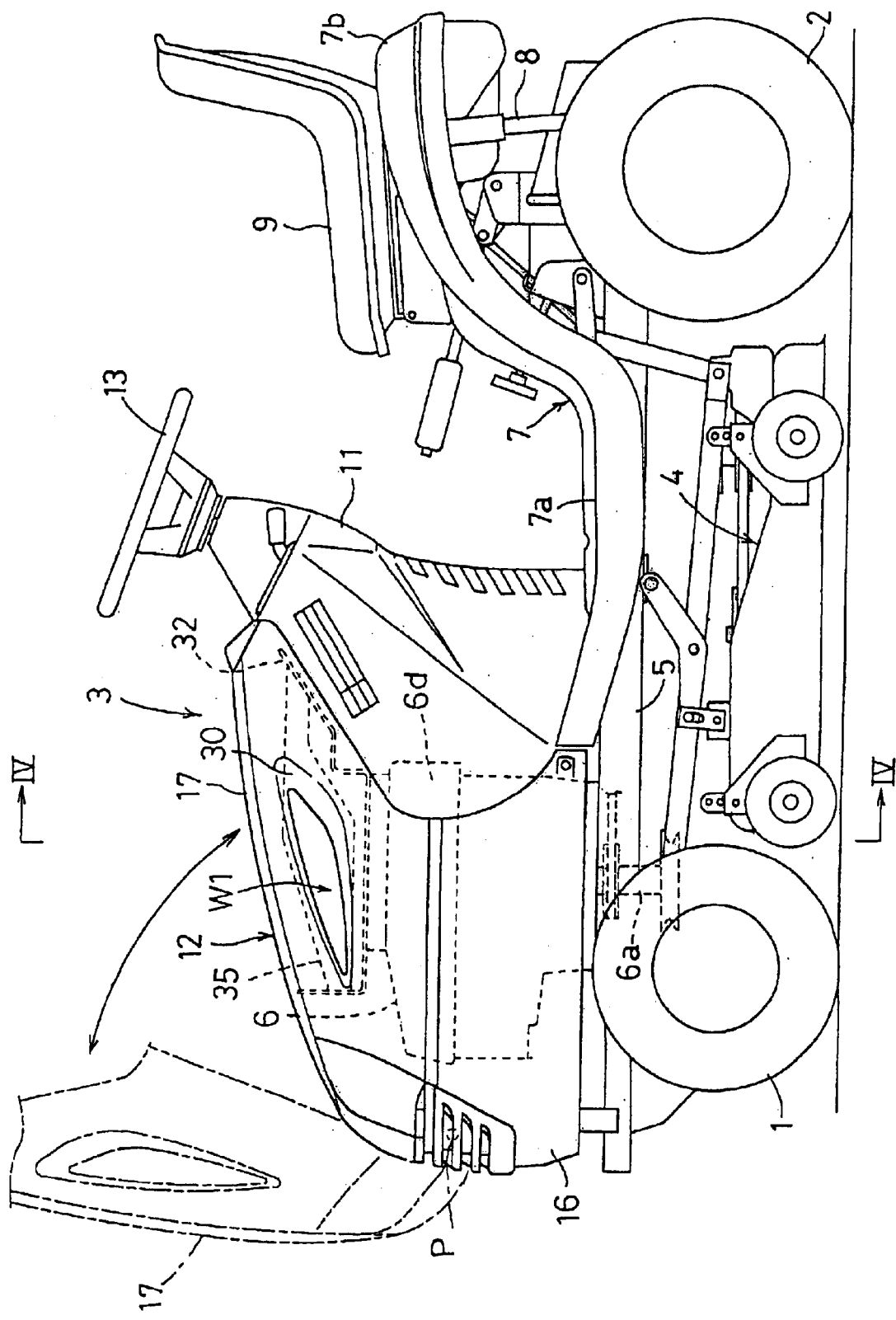
FIG. 1 is a side elevation of a riding lawn mower employing an engine enclosure having cooling air intake openings formed in an upper hood according to this invention.
Figure 2:
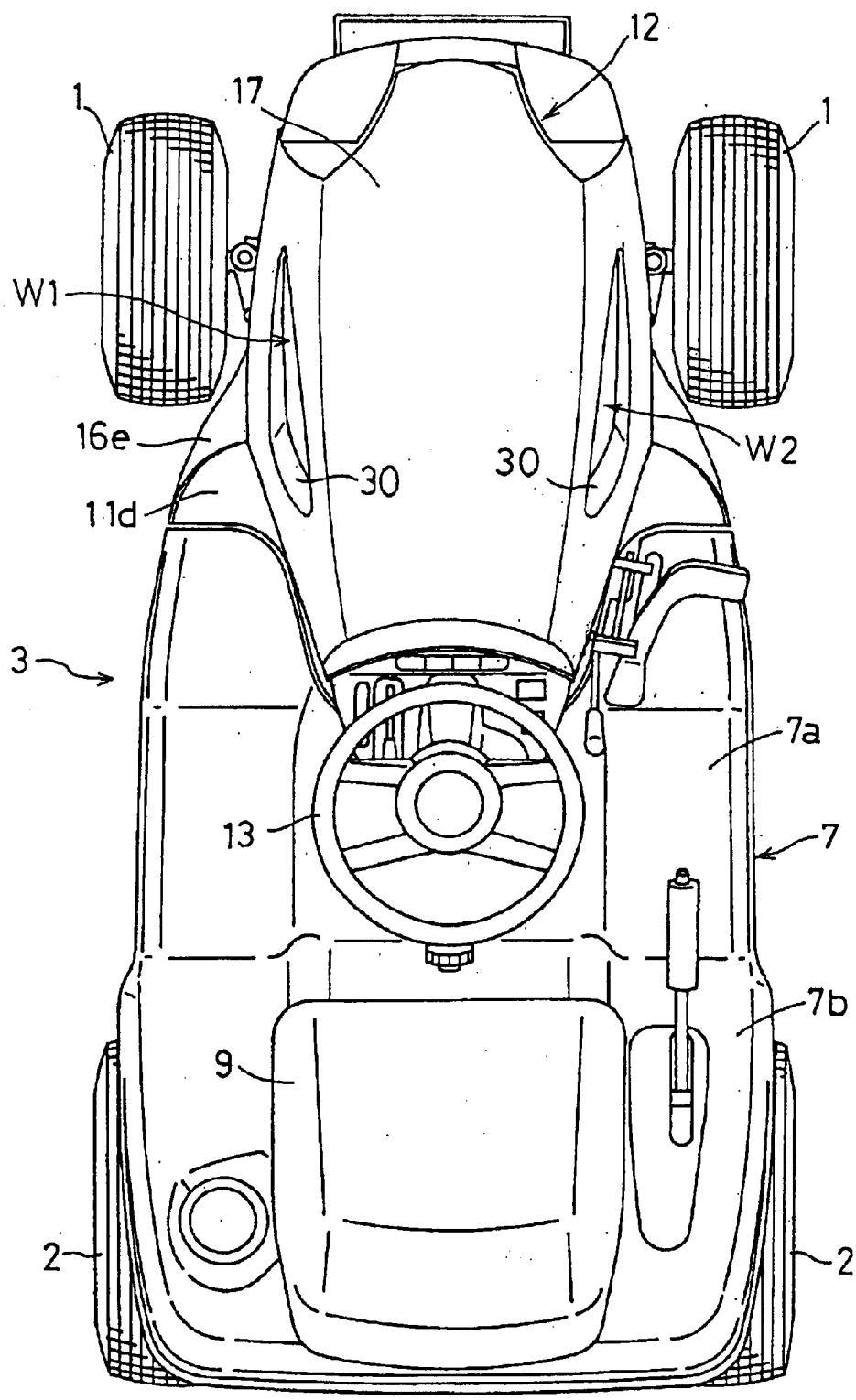
FIG. 2 is a plan view of the riding lawn mower shown in FIG. 1.

One example of the engine enclosure, or an engine hood having cooling air intake openings, according to this invention will be described hereinafter based on a mid-mount type riding lawn mower. As shown in FIGS. 1 and 2, the mid-mount type riding lawn mower includes a four-wheeled vehicle body 3 having dirigible front wheels 1 and rear drive rear wheels 2. A mower unit 4 is vertically movably suspended from the vehicle body 3 between the front and rear wheels 1 and 2. An air-cooled engine 6 is mounted on front portions of a pair of right and left body frames 5 of the vehicle body 3. A fender member 7 is attached to the body frames 5 through a suspension mechanism 8 to extend from a longitudinally intermediate portion to the rear end of the vehicle body.

The fender member 7 includes a footrest 7a and a rear wheel fender 7a integrated together. A driver's seat 9 is mounted in a transversely middle position on an upper surface of the rear wheel fender 7a to be positionally adjustable longitudinally of the vehicle body.

Figure 3:
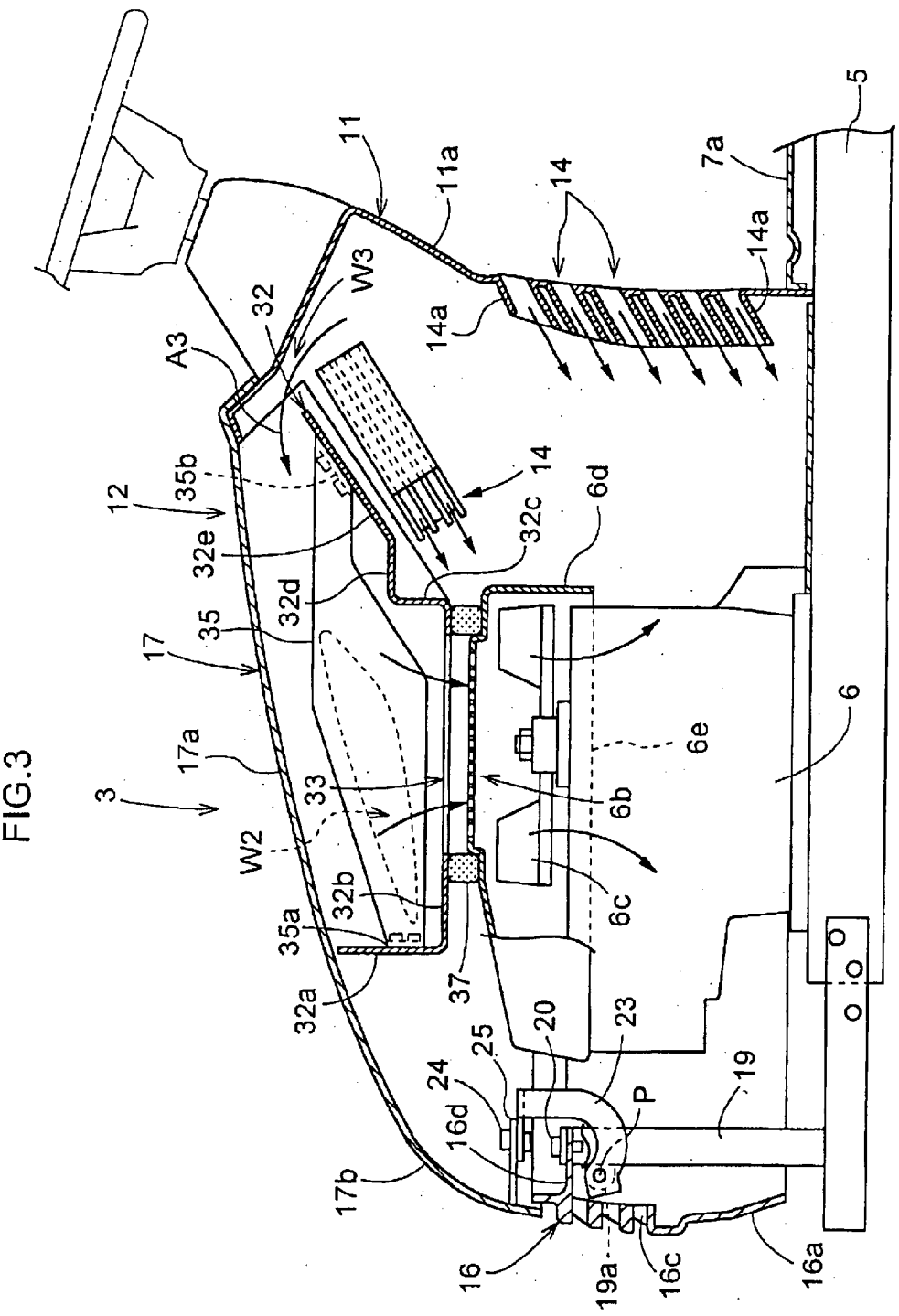
FIG. 3 is a sectional view of the riding lawn mower showing a partition wall member used in the engine enclosure according to this invention.

The engine 6 is the vertical shaft type having a cooling air intake fan 6c and a suction port 6b arranged above (FIG. 3). A downwardly extending output shaft 6a of the engine 6 is interlocked by a belt to a transmission, not shown, disposed in a rear portion of the vehicle body for driving the rear wheels 2. The output shaft 6a and mower unit 4 also are interlocked by a belt. As shown in FIG. 3, a fan cover 6d covers the cooling air intake fan 6c. Preferably, the fan cover 6d has a lower end 6e thereof located below the lower end of fan 6c.

The engine 6 is housed in a control panel 11 erected on the body frames 5 forwardly of the driver's seat 9, and a hood 12 disposed forwardly of the control panel 11.

Figure 4:
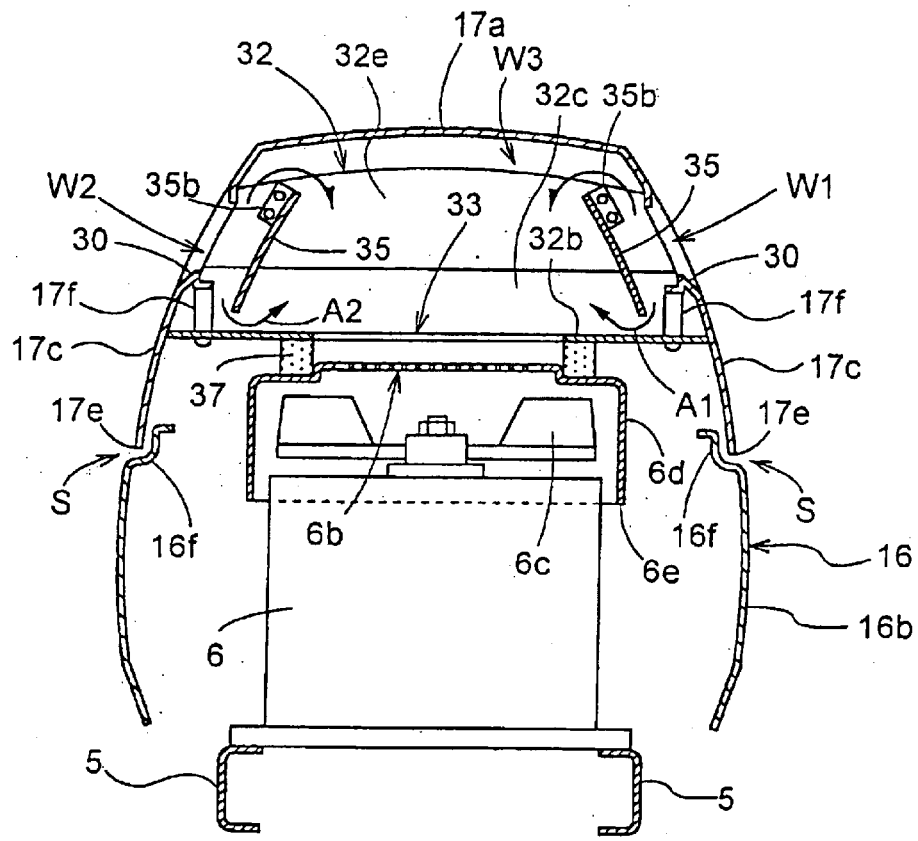
FIG. 4 is a sectional view taken on line IV of FIG. 1 and showing a hood region of the riding lawn mower.
Figure 12:
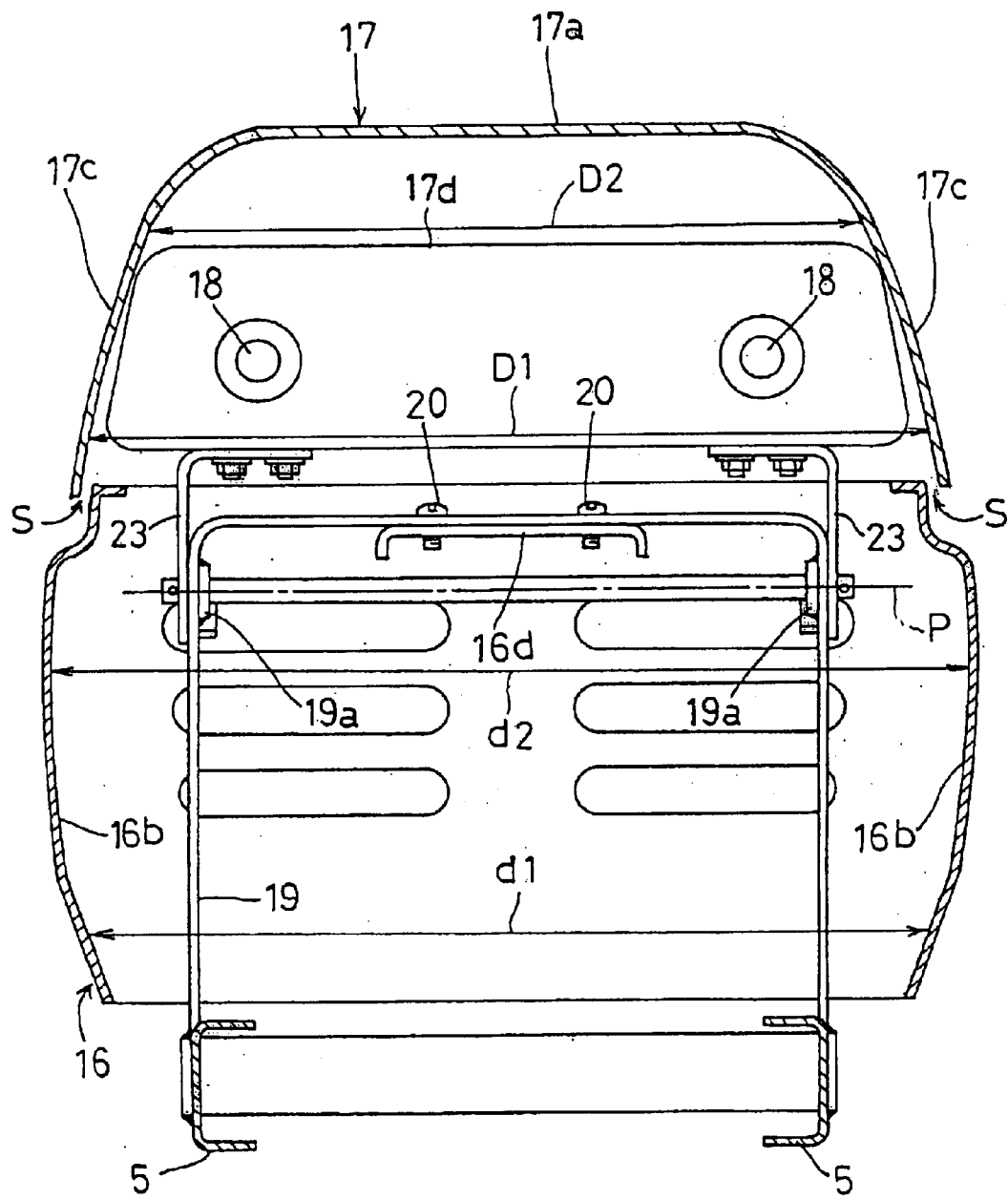
FIG. 12 is a view in vertical section showing a frame structure of the riding lawn mower.
Figure 13:
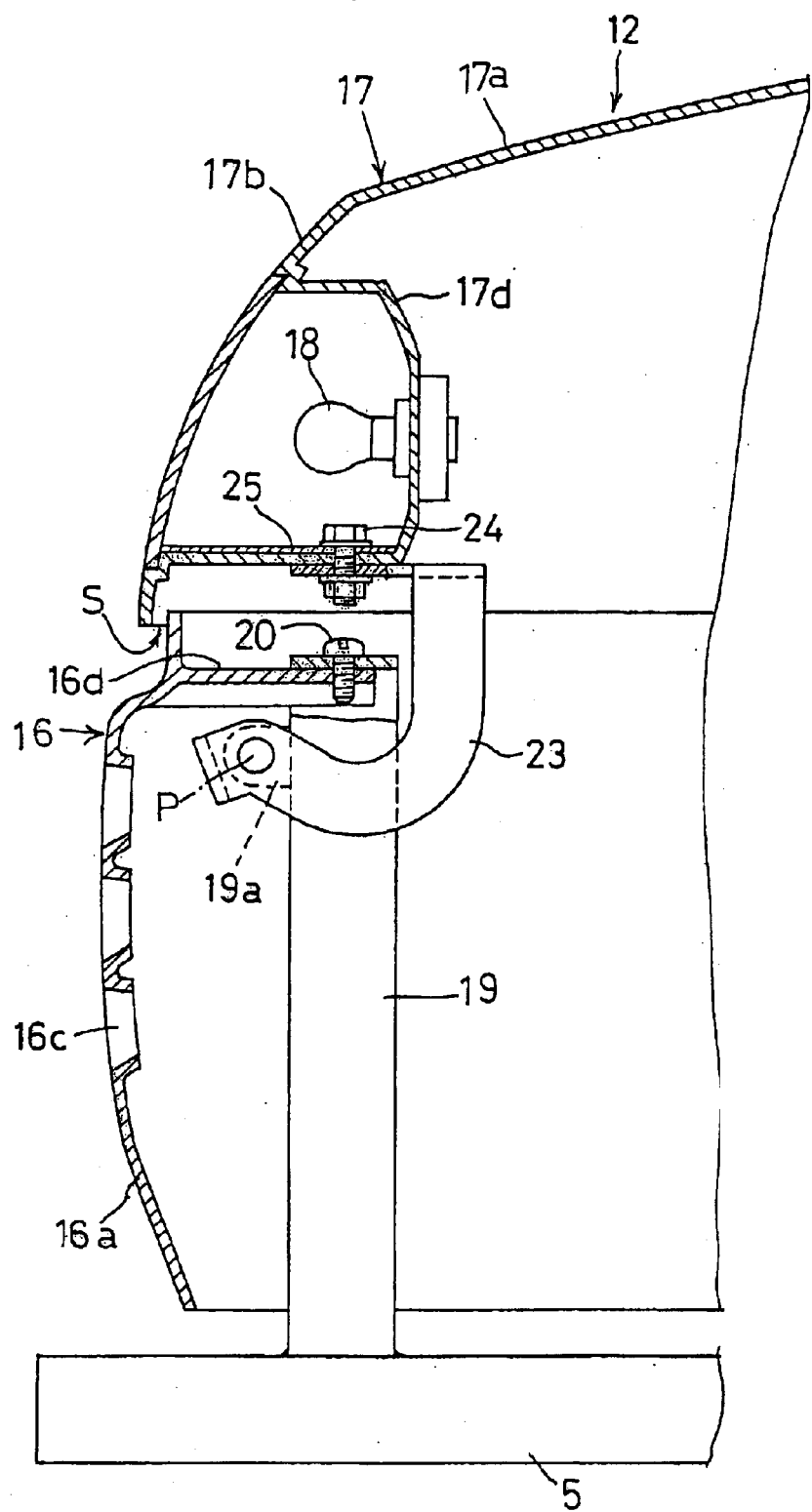
FIG. 13 is a view in vertical section showing a front region of the hood of the riding lawn mower.

As shown in FIGS. 3 and 4, the hood 12 includes a lower hood 16 and an upper hood 17 formed of plastic. The upper hood 17 has a lower end 17e thereof located above the lower end 6e of fan cover 6d. The lower hood 16 has a front wall 16a and right and left side walls 16b. The front wall 16a defines a ventilating grille 16d. The upper hood 17 has an upper wall 17a, a front wall 17a and right and left side walls 17c. The front wall 17d headlights 18 mounted therein (FIGS. 12 and 13).

Next, cooling air intake openings W1 and W2 formed in the upper hood 17, a partition wall member 32 for restricting mixing of air from the intake openings W1 and W2 and hot air generated by heat from the engine 6, and peripheral structures thereof, will be described.

As shown to FIGS. 1 and 2, the cooling air intake openings W1 and W2 are formed in the right and left side walls 17c of the upper hood 17. In this embodiment, each of the intake openings W1 and W2 has a triangular overall shape diverging rearwardly. The cooling air intake openings W1 and W2 have peripheral portions 30 inclined inwardly. In this embodiment, the peripheral portions 30 have substantially the same thickness as the other portions of the upper hood 17.

The cooling air intake openings W1 and W2, preferably, are located as a whole in positions corresponding to the suction port 6b of the fan 6c in the fore and aft direction, and slightly above the suction port 6b in side view. In this embodiment, the cooling air intake openings W1 and W2 have forward ends thereof located forwardly of the suction port 6b of the fan 6c, and rear ends substantially the same as or rearwardly of suction port 6b of the fan 6c.

In addition, the cooling air intake openings W1 and W2 are continuously open from the forward ends to the rear ends and from upper edges to lower edges. The lower edges of the cooling air intake openings W1 and W2 are located substantially above the lower end 17e of upper hood 17. It is desirable that the lower edges are located at least 5 cm, preferably 10 cm or more, above the lower end 17e.

The cooling air intake openings W1 and W2 may have a fore and aft length and a vertical dimension determined from design factors, but should desirably secure a certain area therefor. The engine 6, when running, draws a fixed quantity of air by suction of the fan 6c. Where the air intake openings W1 and W2 were too small, air could be drawn at high speed therethrough to increase the possibility of entraining dust, grass clippings and the like. The cooling air intake openings W1 and W2 should desirably have a sum of area at least 60 square centimeters, preferably 100 square centimeters or larger, and more preferably 120 square centimeters or larger.

As noted hereinbefore, the main function of the partition wall member 32 is to restrict mixing of ambient air taken in through the intake openings W1 and W2 and hot air generated by heat from the engine 6. Its second function is to guide the ambient air from the intake openings W1 and W2 to the air intake fan 6c of the engine 6. Thus, the presence of the partition wall member 32 enables the engine 6 to be supplied with air at substantially the same temperature as ambient air.

Figure 6:
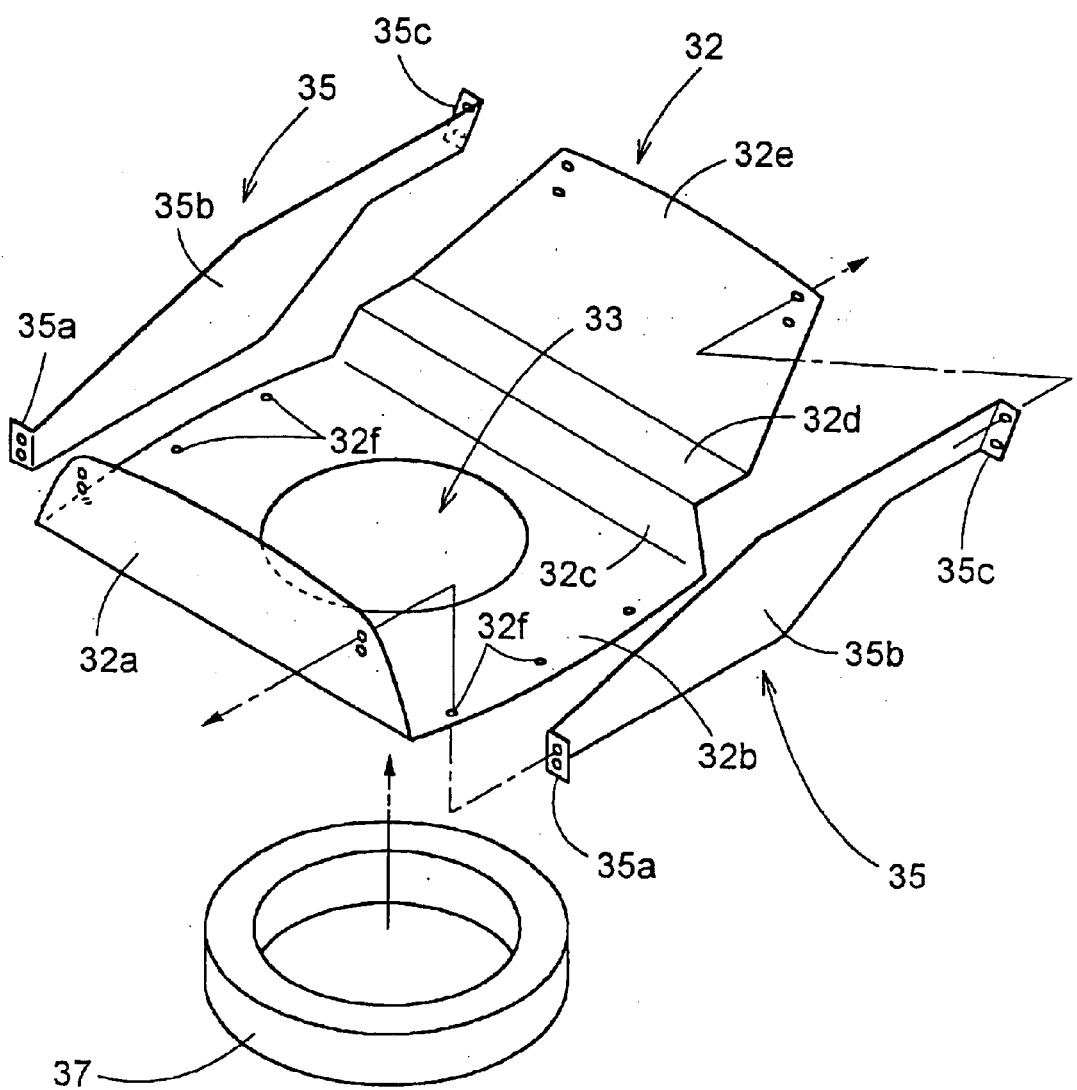
FIG. 6 is an exploded perspective view showing a main portion of the partition wall member forming part of this invention.

FIG. 6 shows an overall configuration of partition wall member 32 in this embodiment. FIG. 4 shows the partition wall member 32 mounted in the upper hood 17. Referring to FIG. 6, the partition wall member 32 is formed by bending a single steel sheet, and includes a front portion 32a extending substantially vertically upward, a main body portion 32b defining an opening 33 in a position corresponding to the suction port 6b of the engine 6, a portion 32c disposed immediately rearwardly of the main body portion 32b and extending substantially vertically upward, a portion 32d extending substantially horizontally from the portion 32c, and an inclined portion 32e extending rearward and upward from the horizontal portion 32d. The portions 32c and 32d are provided to avoid interference of the partition wall member 32 with components arranged rearwardly such as a steering column 13a described hereinafter. Instead of a single sheet, the partition wall member 32 may be formed of a plurality of sheets having appropriate shapes joined together with screws, bolt or the like. The material of the partition wall member 32 is not limited to steel, but may be any other material such as aluminum or plastic that has a certain degree of rigidity and withstands a certain degree of temperature.

The portions 32a–32e of the partition wall member 32 have peripheries thereof opposed to the upper hood 17 and shaped to correspond to inner surfaces of the upper hood 17. Thus, there is substantially no gap between the upper hood 17 and partition wall member 32 except an air intake opening W3 for cooling a rearward area as described hereinafter.

As shown in FIG. 4, the entire partition wall member 32 is attached to the upper hood 17 through a plurality of, e.g. six, bosses 17f extending downward from the upper hood 17. The bosses 17f are internally threaded from lower ends upward. The partition wall member 32 is held in place by screws extending through mounting bores 32f (FIG. 6) and disengaged with the bosses 17f. With the partition wall member 32 fixed to the upper hood 17 as described above, the elastic upper hood 17 is fixed accurately to the partition wall member 32 even if the upper hood 17 has transverse dimensions not fixed accurately in time of manufacture. Thus, the widths of the upper hood 17 in the portions where the upper hood 17 contacts the lower hood may be determined accurately. In addition, the partition wall member 32 acts to damp vibration of the upper hood 17.

With the partition wall member 32 attached to the upper hood 17 as described above, the upper portion of engine 6 can be exposed only by moving the upper hood 17 to an open position. This is convenient in facilitating inspection and maintenance of the engine 6. Strictly, in order for the partition wall member, shown in FIG. 6, attached to the upper hood 17 to perform its functions, part of the upper hood 17 may act also as an upper surface of the partition wall member.

The main body portion 32c has a cylindrical seal member 37 formed of sponge and attached by an adhesive to the lower surface thereof around the opening 33. Double-stick tape may be used instead of the adhesive. The seal member 37 restricts leakage of ambient air from between the opening 3 and the suction port 6b of engines 6. The seal member 37 may have any other shape than cylindrical and may be formed of an elastic material such as rubber as long as it performs the function to restrict leakage of ambient air.

A pair of right and left barrier walls 35 are attached to the partition wall member 32 to extend in the fore and aft direction between the portions 32a and 32e. As shown in FIG. 4, the barrier walls 35 are located adjacent the cooling air intake openings W1 and W2 when the partition wall member 32 is attached to the upper hood 17. Each barrier wall 35 includes a main body 35b, a front mounting portion 35a extending outward from and perpendicular to a forward end of the main body 35b, a rear end mounting portion 35c extending outward from and perpendicular to a rearward end of the main body 35b. Each of the front end mounting portion 35a and rear end mounting portion 35c is attached to a corresponding position of the partition wall member 32 by amounting device, typically screws or bolts and nuts. This mounting device may be an adhesive, instead.

The main body 35b of each barrier wall 35 is narrow at the forward end thereof, wide at an intermediate portion, and narrow again at the rearward. The intermediate portion of the main body 35b is located in a position corresponding to the cooling air intake opening W1 or W2. The barrier walls 35 cover the intake openings W1 and W2 in such a way that one cooling air intake opening W1 is invisible to the other W2. That is, it is preferable that an upper end of the main body 35b of each barrier wall 35 is located above the upper end of cooling air intake opening W1 or W2 and that a lower end of the main body 35b of each barrier wall 35 is located below the lower end of cooling air intake opening W1 or W2.

Besides the design feature for blocking sight of one cooling air intake opening W1 from the other W2, the barrier walls 35 have a function to baffle air flows A1, A2 from the cooling air intake openings W1 and W2. This action causes any dust and grass clippings entering from the cooling air intake openings W1 and W2 to fall along the barrier walls 35, thereby restraining such matters from being drawn directly into the suction port 6b of the engine 6.

Figure 7:
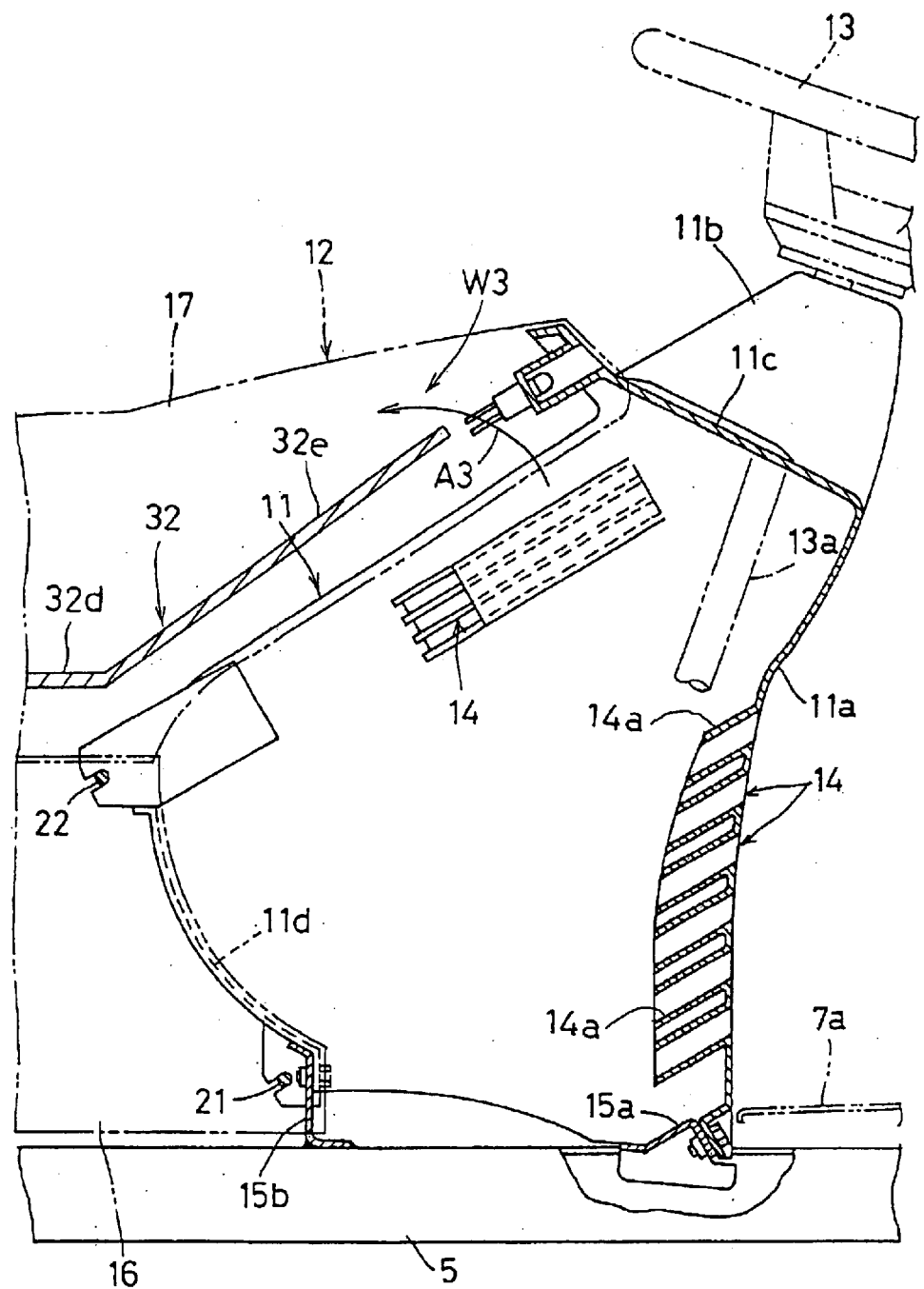
FIG. 7 is a sectional view of a rear portion of the partition wall member used in the engine enclosure in a preferred embodiment of this invention.
Figure 8:
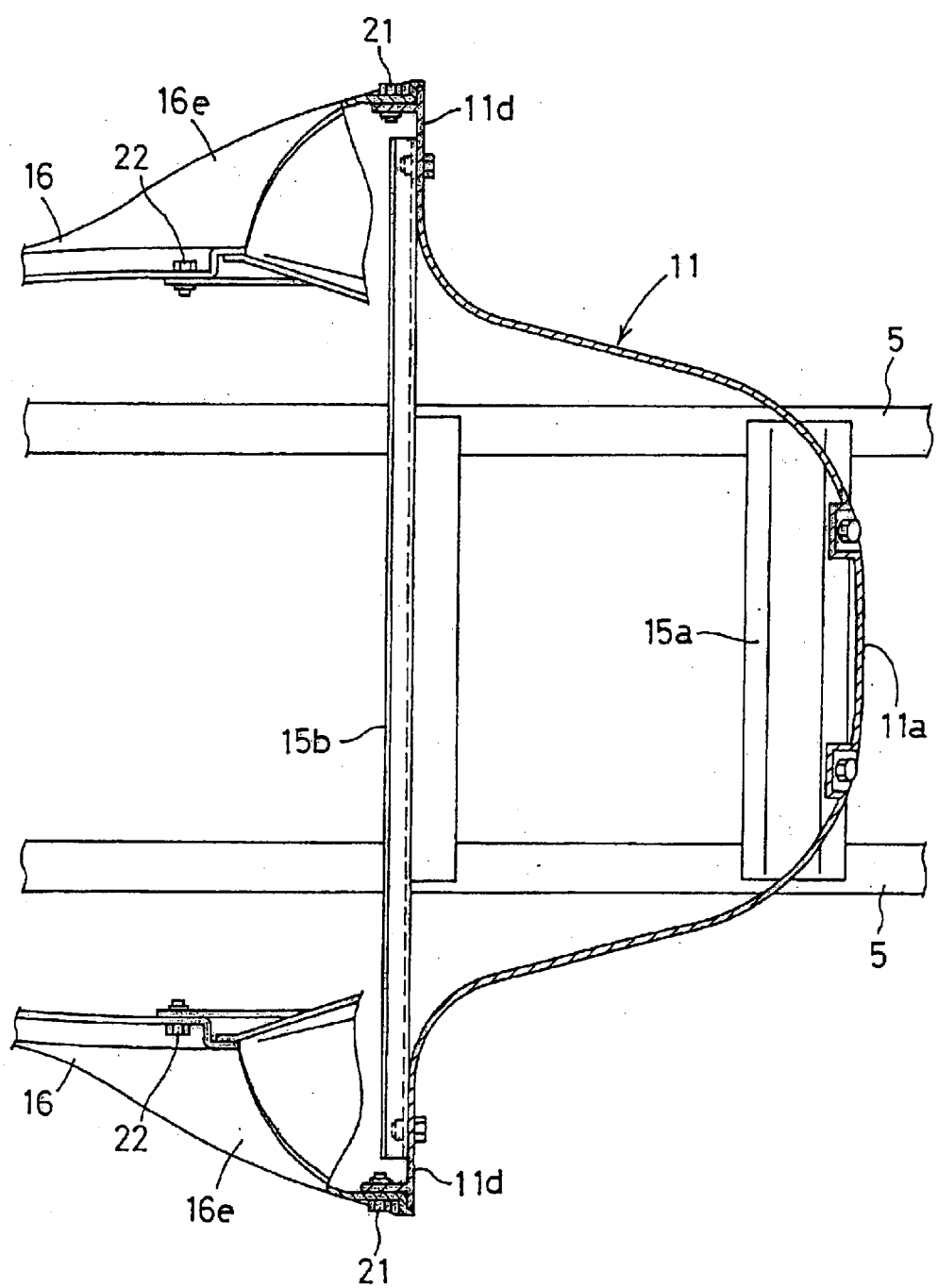
FIG. 8 is a cross-sectional view showing a connection between a rear portion of the hood and a control panel.
Figure 9:
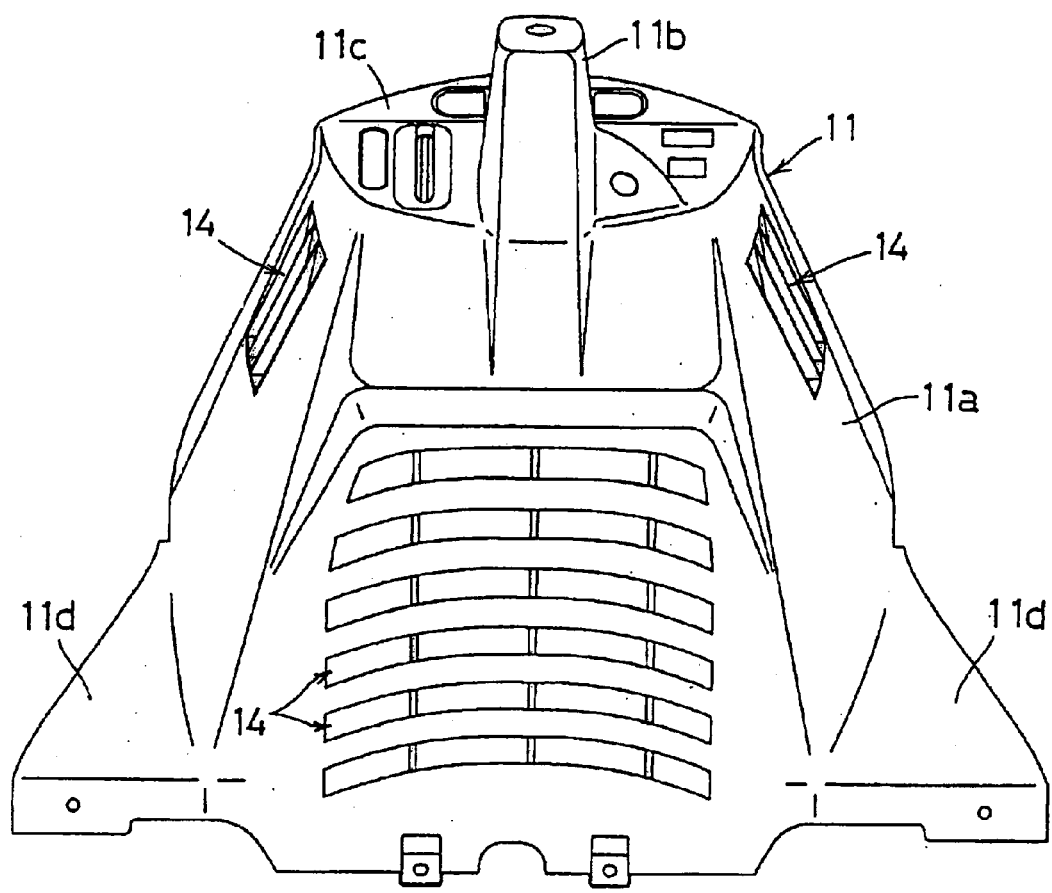
FIG. 9 is a rear view showing the control panel.
Figure 10:
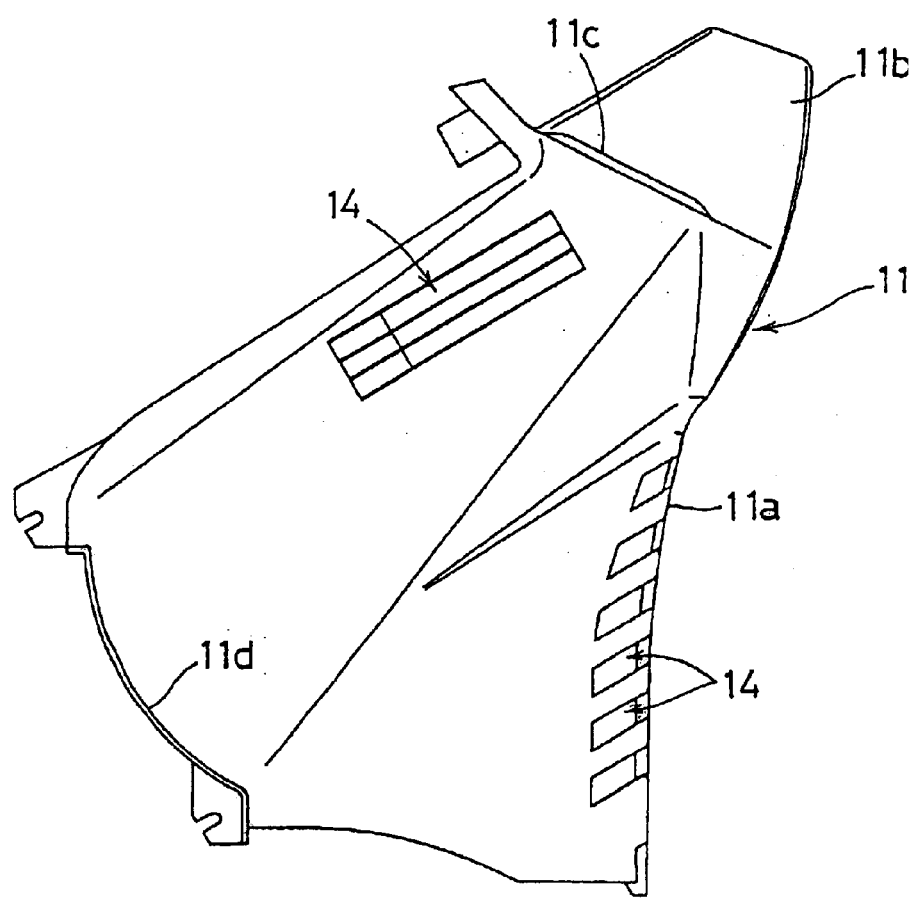
FIG. 10 is a side view of the control panel.
Figure 11:
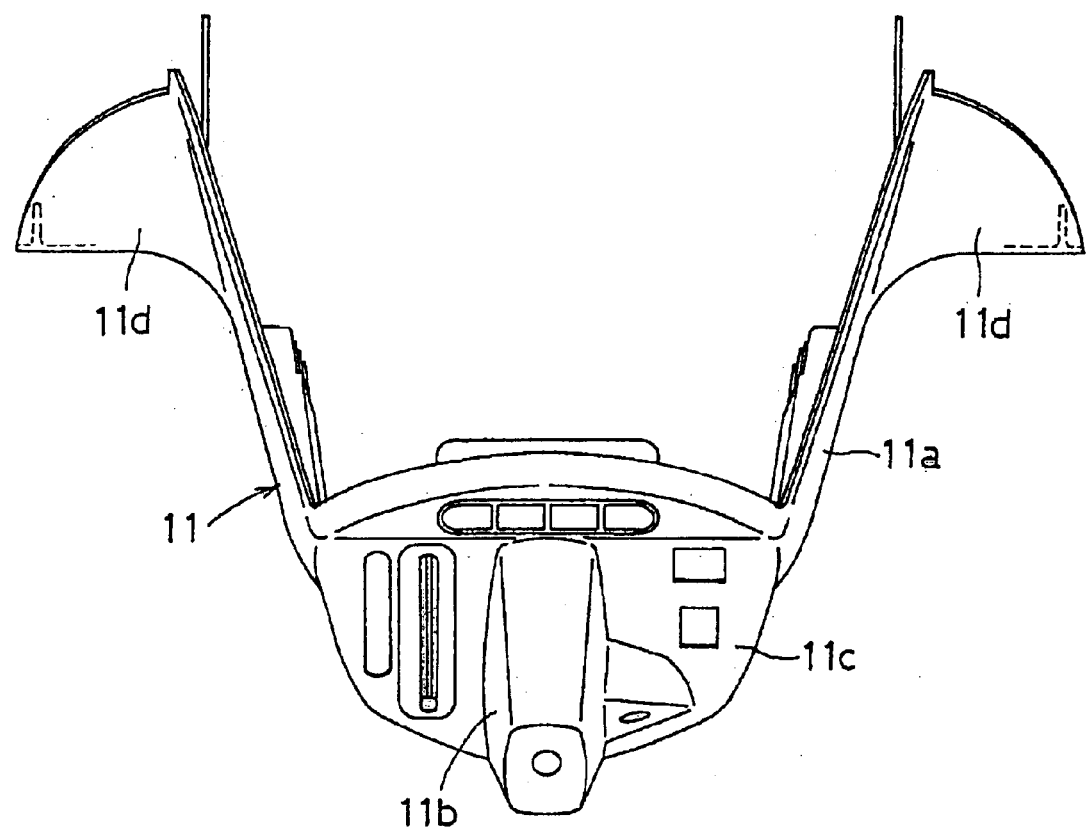
FIG. 11 is a plan view showing a steering column portion of the control panel.

As shown in FIGS. 3 and 7, the air intake opening W3 for cooling a rearward area is formed in a gap between the upper hood 17 and the inclined portion 32e extending rearward and upward of the partition wall member 32. The rear area cooling air intake opening W3 in an opening for taking in ambient air flows A3 from upper slits 14 formed in a main panel body 11a is described hereinafter. The rear area cooling air intake opening W3 is located rearwardly of forward ends of the upper slits 14 and preferably adjacent the upper ends of the slits 14. Though not shown, instead of the slits 14 formed in the main panel body 11a, slits or openings may be formed in rear positions of the upper hood 17, i.e. positions of the upper hood 17 adjacent the main panel body 11a, from which ambient air is drawn into the rear cooling air intake opening W3.

Figure 14:
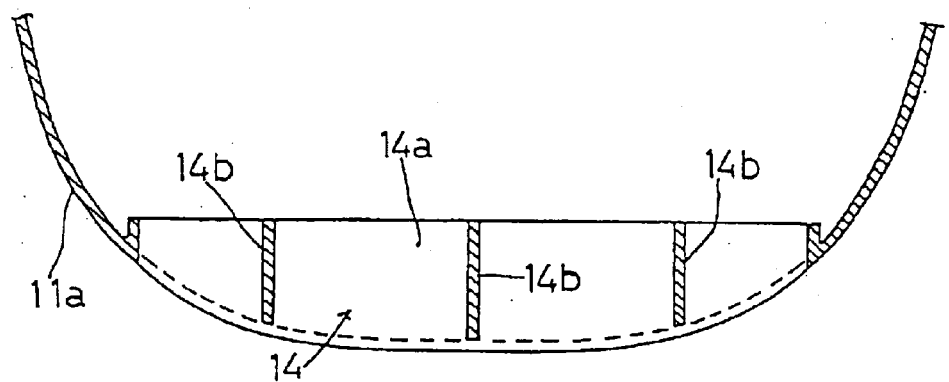
FIG. 14 is a sectional view showing a slit structure formed in a rear surface of the control panel of the riding lawn mower.
Figure 15:
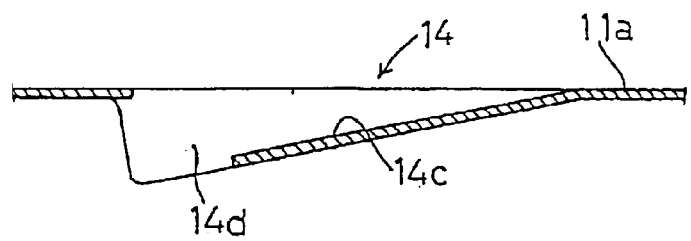
FIG. 15 is a sectional view showing a slit structure formed in an upper side surface of the control panel of the riding lawn mower.
Figure 16:
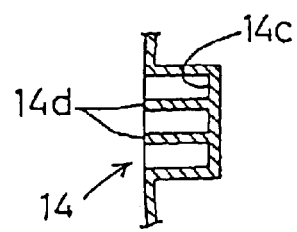
FIG. 16 is a sectional view showing a slit structure formed in an upper side surface of the control panel of the riding lawn mower.

As shown in FIG. 7, the control panel 11 has a main panel body 11a, a bulge portion 11b penetrated by the steering column 13a of steering wheel 13 and an instrument panel 11c formed integrally by plastic molding. The main panel body 11a has slits 14 for cooling air flow intake formed in a front surface thereof (i.e. a rear surface with respect to the lawn mower) and right and left side surfaces. Inclined guides 14a also are provided particularly for the slits 14 formed in the front surface (rear surface) for directing engine cooling air forward and downward. FIG. 14 shows a section of a front surface (rear surface) portion of the main panel body 11a including the inclined guides 14a and ribs 14b extending vertically. FIGS. 15 and 16 are sectional views of a slit 14 formed laterally of the main panel body 11a, showing fins 14d inclined relative to the lawn mower and a side wall 14c extending vertically.

Further, the main panel body 11a has right and left portions at a lower end spreading outward, with the lower end bolted to a stay 15a joined to the body frames 5. As shown in FIGS. 8 through 11, the right and left spread-out portions lid at the lower end of main panel body 11a act as foot-receiving portions continuous with right and left forward ends of the foot-rest 7a of the fender member 7 and extending forward and upward. As seen from FIG. 8, the right and left spread-out portions lid also are bolted to right and left extensions of a stay 15b mounted on the body frames 5.

As seen from FIG. 12, the right and left side walls 16b of lower hood 16 are shaped and arranged such that a distance d1 between lower regions of side walls 16b is smaller than a distance d2 between intermediate regions of side wall 16b. Further, the right and left side walls 17c of the upper hood 17 are shaped and arranged such that a distance D1 between lower regions of side walls 17a is larger than a distance D2 between intermediate regions of side wall 17a. Thus, the lower hood 16 is formed to have a downwardly diminishing cross-section, while the upper hood 17 is formed to have an upwardly diminishing cross-section.

As seen from FIGS. 12 and 13, the lower hood 16 has a mounting element 16d extending from the front wall 16a thereof and connected by bolts 20 to a top of an arched support member 19 erected on forward positions of the body frames 5. As seen from FIG. 8, the lower hood 16 has lower portions spreading outward, and these spread-out portions 16e are continuous with the right and left spread-out portions lid at the lower end of control panel 11. The lower hood 16 is detachably connected at lower, rear right and left ends thereof laterally by bolts 21 to the spread-out portions lid of control panel 11. Further, the lower hood 16 is detachably connected at upper, rear right and left ends thereof by bolts 22 to the control panel 11. As shown in FIG. 13, a pair of right and left hinge members 23 are connected by bolts 24 to bottoms of headlight boxes 17d at the front of upper hood 17. The hinge members 23 are attached at free ends thereof to mounting pieces 19a disposed in right and left upper positions of the support member 19 to be vertically pivotable about an axis P. The upper hood 17 may be opened and closed by pivoting about the axis P when carrying out a simple servicing such as replenishment of engine oil and exchange of ignition plugs.

In this way, the upper hood 17 is displaceable between an open position and a closed position in contact with the lower hood 16. By removing the bolts 20, 21 and 22, drawing the lower hood 16 forward, and detaching the entire hood 12, the engine room may be opened by a large extent. This enables a major inspection and maintenance such as an inspection and maintenance of lower positions of the engine or detachment of the engine.

Figure 5:
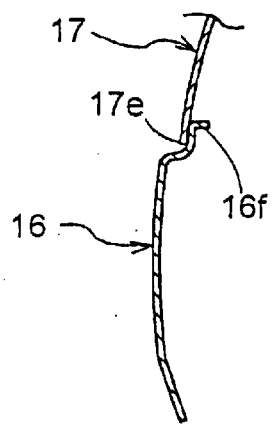
FIG. 5 is a sectional view showing a contact portion between the upper hood and lower hood.

The lower end 17e of upper hood 17 covers the upper end (upper end of 16f) of the fixed lower hood 16 with a space S of several millimeters in between. This space S may be used as an inlet of ambient air flows. Where the engine 6 is a water-cooled diesel engine of the vertical shaft type equipped with a radiator, the space S is used as a vent opening for releasing the heat in the engine room along with air flows from the radiator. The space S extends to the vicinity of the rear end of upper hood 17. A rear end portion of the lower end 17e of upper hood 17 overlaps and contacts the upper end 16f of lower hood 16 as shown in FIG. 5.

Each bolt 24 connecting the hinge member 23 to the upper hood 17 has a washer 25 shaped to cover a large area of an inner bottom surface of the headlight box 17d. The washer 25 has a glossy upper surface to act as a reflector of the headlight 18.

The upper hood 17 having the cooling air intake openings W1 and W2 according to this invention is manufactured by injection molding. In manufacture, a resin is injected into a mould (not shown) from a position of the rearmost end of the upper hood 17. In addition, the resin may be injected from positions of lower ends at the right and left sides of the upper hood 17. Preferably, these lower ends are located at the lower end 17e of the upper hood 17 and forwardly of longitudinally middle positions of the cooling air intake openings W1 and W2.

(Other Embodiments)

Figure 17:
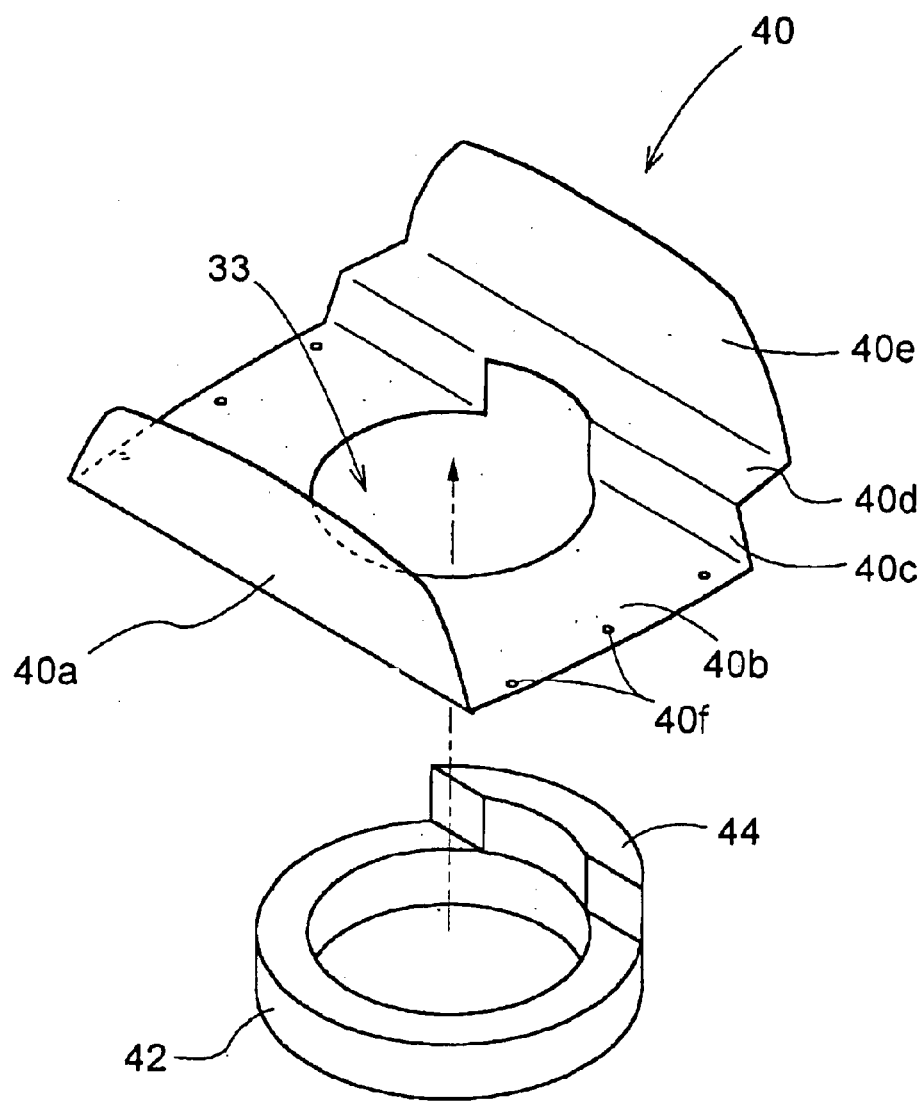
FIG. 17 is a perspective view of a partition wall member in another embodiment of this invention.

FIG. 17 shows a partition wall member 40 in another embodiment of this invention. This partition wall member 40 is formed by bending a single steel sheet as in the foregoing embodiment, and includes a front portion 40a extending substantially vertically, a main body portion 40b defining an opening 33 in a position corresponding to the suction port 6b of the engine 6, a portion 40c disposed immediately rearwardly of the main body portion 40b and extending substantially vertically upward, a portion 40d extending substantially horizontally from the portion 40c, and an inclined portion 40e extending substantially vertically rearward from the horizontal portion 40d to the lower surface of the upper hood 17. As shown, the portion 40c defines a cutout. This is provided because the circular opening 33 in plan view is displaced rearward. The portions 40c and 40d are provided to avoid interference of the partition wall member 40 with components arranged rearwardly such as the steering column 13a. In this embodiment, no rear area cooling air intake opening is provided, but ambient air only from the cooling air intake openings W1 and W2 is drawn into the suction port 6b of engine 6. The main body portion 40c has a cylindrical seal member 42 formed of sponge and attached by an adhesive to the lower surface thereof around the opening 33. Further, an arcuate seal member 44 is provided for covering the cutout of the portion 40c.

The other aspects of this partition wall member 40 such as the mounting structure to the upper hood 17 are the same as those of the partition wall member 32 in the preceding preferred embodiment.

Figure 18:
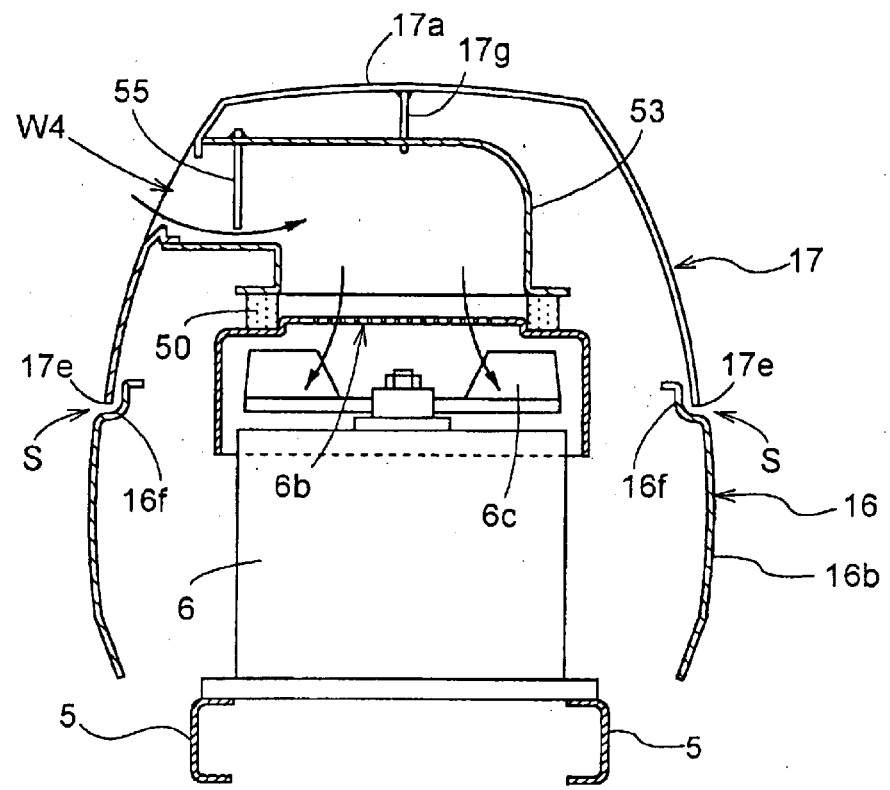
FIG. 18 is a sectional view showing a further embodiment of this invention.
Figure 19:
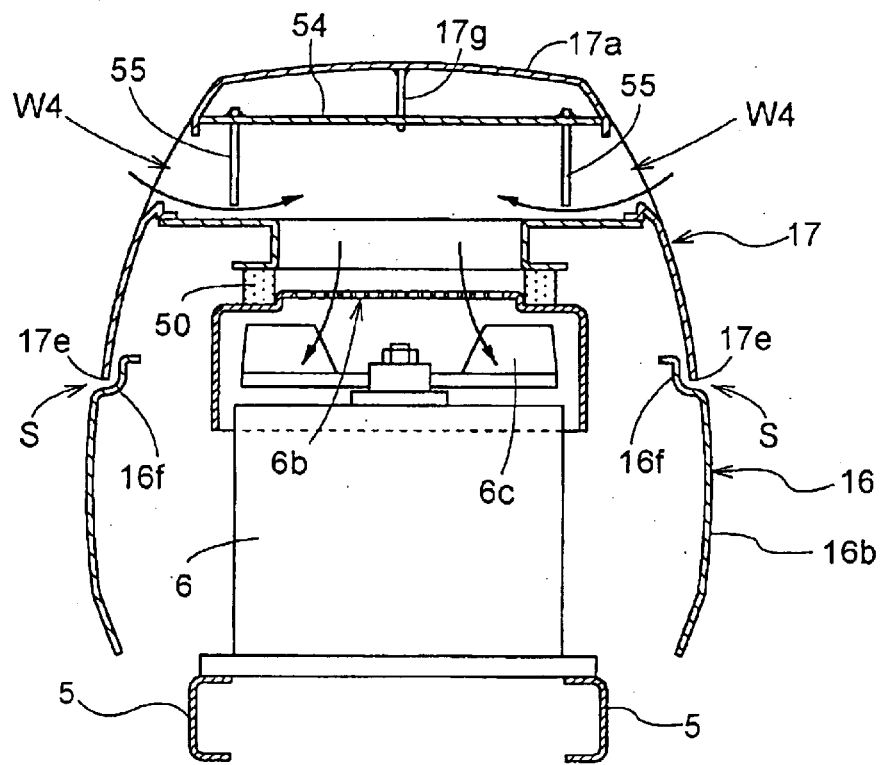
FIG. 19 is a sectional view showing a still further embodiment of this invention.

FIGS. 18 and 19 show partition wall members 53 and 54 in further embodiments. In the embodiment shown in FIG. 18, the upper hood 17 has a cooling air intake opening W4 formed in only one side thereof, e.g. only in the right side. In addition, the partition wall member 53 defines a (cylindrical) duct of plastic or vinyl material. The partition wall member 53 has an opening portion adjacent the cooling air intake opening W4, which opening portion is large enough to surround the cooling air intake opening W4. A lower side of this opening portion may be bolted to a boss extending downward from the upper hood 17, or bolted directly to the upper hood 17 as shown.

The partition wall member 53 is bolted in an upper position thereof to a boss 17g extending downward from the upper surface of upper hood 17. In addition, the partition wall member 53 has a cylindrical lower portion opposed to the suction port 6b of engine 6, with a cylindrical seal member 50 formed of sponge attached by an adhesive.

Where, as shown in FIG. 19, cooling air intake openings are formed in both sides of the upper hood, such a duct-like partition wall member may of course be used. In this case, partition wall member (i.e., duct) 54 may be bifurcated to extend toward the two cooling air intake openings, so that each extension defines a wall barrier 55.

Figure 20:
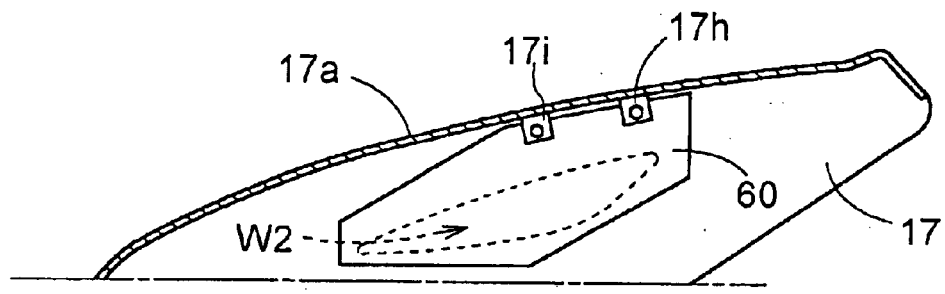
FIG. 20 is a side view showing a modified partition wall according to this invention.

FIG. 20 shows a single barrier wall 60 used in place of the pair of barrier walls 35 used in the preceding preferred embodiment. The barrier wall 60 is fixed to a transversely middle position on the lower surface of the upper wall 17a of the upper hood 17. The barrier wall 60 is sized and positioned in such a way that one cooling air intake opening W1 is invisible to the other W2. Preferably, the barrier wall 60 has two mounting bores 17h and 17i formed adjacent the upper end thereof, so that the barrier wall 60 is fixed to the upper hood 17 by engagement between bolts passed through the mounting bores and mounting tabs attached to the upper wall 17a. Reference sign 40f denotes mounting bores just like the mounting bores 32f shown in FIG. 6.

The barrier wall 60 may be fixed to the partition wall member 40 by welding or bolts and nuts to extend in the fore and aft direction along the transversely middle position of the partition wall member 40.

Figure 21:
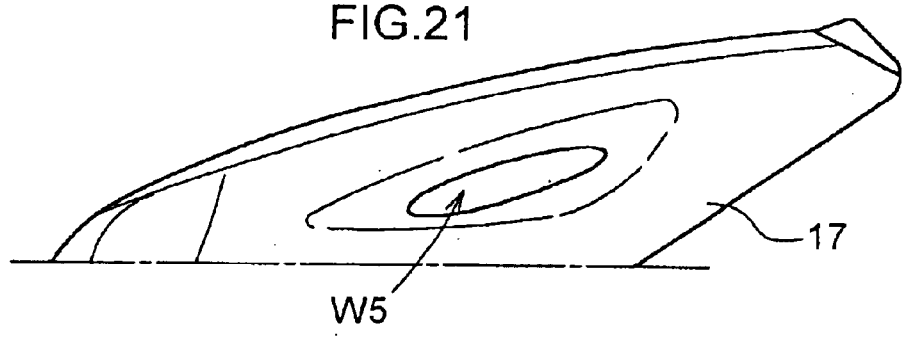
FIG. 21 is a fragmentary side view showing a modified cooling air intake formed in the upper hood according to this invention.
Figure 22:
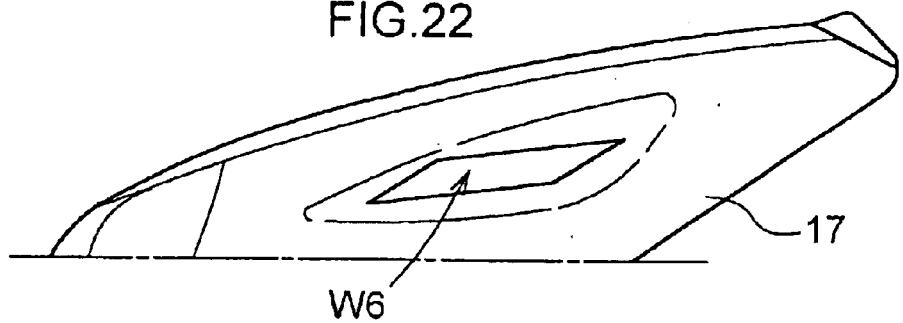
FIG. 22 is a fragmentary side view showing another modified cooling air intake formed in the upper hood according to this invention.
Figure 23:
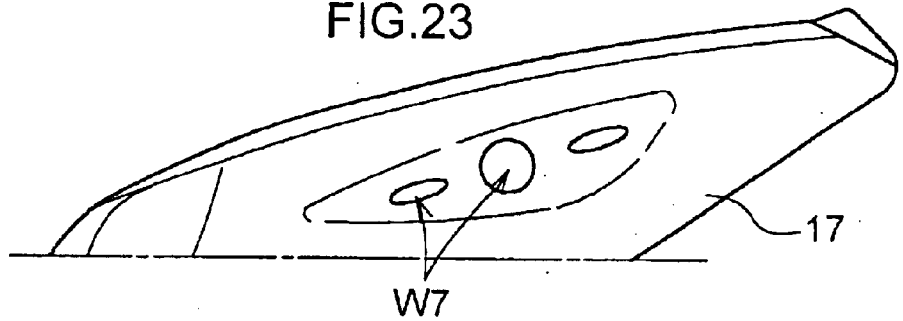
FIG. 23 is a fragmentary side view showing a further modified cooling air intake formed in the upper hood according to this invention.

In addition, the cooling air intake opening formed in the upper hood 17 may be shaped otherwise than that shown in the preceding preferred embodiment. Each cooling air intake opening W5 may be oval as shown in FIG. 21, or each cooling air intake opening W6 may be rectangular or parallelogramic as shown in FIG. 22. As shown in FIG. 23, a plurality of cooling air intake openings W7 may be formed in each side. In this case, the openings may be circular or rectangular.

What is claimed is:

1. An engine enclosure for use on a vehicle having a cooling system for a vertical shaft type engine with a cooling air intake fan disposed above the engine, said engine enclosure comprising:
    an upper hood for covering said engine from above, said upper hood having an upper surface and right and left side surfaces extending downward from said upper surface;
    a lower hood for covering lateral areas of said engine; and
    a cooling air intake openings formed in a position above a lower end of respective said right and left side surfaces of said upper hood for taking in ambient air,
    wherein at least one barrier wall is disposed near each of said cooling air intake openings and between said cooling air intake openings, and the at least one barrier wall causes one of said cooling air intake openings to be invisible to another of said cooling air intake openings, and vice versa.

2. An engine enclosure as defined in claim 1, further comprising a fan cover for covering an upper portion of said engine including said fan and having an air passage for permitting inflow of cooling air to said fan, the lower end of said upper hood being located above a lower end of said fan cover.

3. An engine enclosure as defined in claim 1, further comprising a partition wall member disposed between said cooling air intake openings and said cooling air intake fan for restricting mixing of ambient air drawn by said fan and heat generating from said engine.

4. An engine enclosure as defined in claim 3, wherein said partition wall member defines a duct for guiding the ambient air to said fan.

5. An engine enclosure as defined in claim 3, wherein said partition wall member and said upper surface of said upper hood define a duct structure for guiding the ambient air to said fan.

6. An engine enclosure as defined in claim 3, wherein said partition wall member is attached to said upper hood, said upper hood being displaceable between a closed position adjacent said lower hood and an open position, said fan being exposed when said upper hood is in said open position.

7. An engine enclosure as defined in claim 1, wherein said barrier wall disposed between said cooling air intake openings and said fan for restraining said ambient air taken in through said cooling air intake openings from directly reaching said fan.

8. An engine enclosure as defined in claim 2, wherein each of said cooling air intake openings has a lower end thereof located above an upper end of said fan cover covering said fan.

9. An engine enclosure as defined in claim 2, wherein said cooling air intake openings has a forward end thereof located forwardly from a suction port of said fan, and a rear end located in a position corresponding to or rearwardly of said air passage of said fan cover, said cooling air intake opening being open continuously from said forward end to said rear end.

10. An engine enclosure as defined in claim 3, wherein said partition wall member is fixed to said side surfaces of said upper hood.

11. An engine cooling system for use on a lawn mower having a vertical shaft type engine with a cooling air intake fan disposed above the engine, comprising:

a fan cover for covering said fan;

a hood for covering said engine, said hood including:

an upper hood having a lower end located above a lower end of said fan cover; and a lower hood, wherein said upper hood is displaceable between a closed position adjacent said lower hood and an open position;

a cooling air intake opening formed in at least one of said upper hood adjacent a control panel and said control panel for taking in ambient air; and a partition wall member disposed between said cooling air intake opening and said cooling air intake fan for restricting mixing of ambient air drawn by said fan and heat generating from said engine, said partition wall member being fixed to said upper hood, wherein a rear end portion of said partition wall member extends over to a position above said cooling air intake opening to allow passage of ambient air drawn in through a position above the lower end of said upper hood.

12. An engine cooling system as defined in claim 11, wherein said cooling air intake opening is formed in said control panel, said rear end portion of said partition wall member is part of a lower surface of said partition wall member, and said rear end portion of said partition wall member extends in a rearward direction in relation to the lawn mower to allow passage of ambient air from said cooling air intake opening.

13. An engine enclosure as defined in claim 1, wherein each said barrier wall is disposed to each of said cooling air intake openings so as to shield an interior of the engine enclosure.

\* \* \* \* \*

UNITED STATES PATENT AND TRADEMARK OFFICE
CERTIFICATE OF CORRECTION

PATENT NO. : 6,837,324 B2
DATED : January 4, 2005
INVENTOR(S) : Nagai et al.

It is certified that error appears in the above-identified patent and that said Letters Patent is hereby corrected as shown below:

Column 10,
Line 41, "a cooling air" should read -- cooling air --
Line 41, "openings formed" should read -- openings each formed --
Line 57, "between said" should read -- between each of said --

Column 11,
Line 8, "wall disposed" should read -- wall is disposed --
Line 16, "wherein said" should read -- wherein each of said --

Signed and Sealed this

Fifth Day of July, 2005

JON W. DUDAS
*Director of the United States Patent and Trademark Office*